Nov. 27, 1962 N. D. CAPPELLE ETAL 3,065,642

FINE TUNING ATTACHMENT

Filed Jan. 27, 1960 3 Sheets-Sheet 1

INVENTORS
Norman D. Cappelle
BY John J. Kornacker
Robert L. Kahn
Attorney

Nov. 27, 1962 N. D. CAPPELLE ETAL 3,065,642

FINE TUNING ATTACHMENT

Filed Jan. 27, 1960 3 Sheets-Sheet 2

INVENTORS
Norman D. Cappelle
John J. Kornacker
BY Robert L. Kahn
Attorney

FINE TUNING ATTACHMENT

Filed Jan. 27, 1960 3 Sheets-Sheet 3

INVENTORS
Norman D. Cappelle
BY John J. Kornacker
Robert L. Kahn
Attorney 3,065,642
Patented Nov. 27, 1962

3,065,642

FINE TUNING ATTACHMENT

Norman D. Cappelle, Park Ridge, and John J. Kornacker, Niles, Ill., assignors to Oak Manufacturing Co., a corporation of Delaware Filed Jan. 27, 1960, Ser. No. 4,959
10 Claims. (Cl. 74—10.27)

This invention relates to a fine tuning attachment for an index type of tuner and is an improvement upon the attachment disclosed and claimed in the co-pending application of Walter Meyer, Serial No. 828,300, filed July 20, 1959, and assigned to the same assignee now Patent 2,957,356, issued October 25, 1960.

The attachment disclosed and claimed in said application and described there comprises what may be termed a wobble plate rotatively secured upon a shaft for actuating an index type tuner. The wobble plate is free to tilt and is provided with a screw for each index position of the tuner shaft. The screw cooperates with other means for determining the tilt or wobble of the plate which in turn determines the position of a fine tuning means. Such an attachment may be used on television tuners.

In the attachment disclosed and claimed in the Meyer application, it is necessary to adjust each screw individually. It is desirable to provide a means which may be easily and simply manipulated by any television user from the outside of a set and without the use of any screwdrivers or other special tools. This invention provides a simple means for accomplishing this and makes it possible for any person using a television set to make his own individual fine tuning adjustments for each channel or station selection. It is understood that each individual adjustment must be made while the tuner is set to a particular channel and is actually receiving a signal. The adjustment itself simply consists in pushing a knob in and then turning same until a clear picture is obtained.

This invention requires each adjusting screw on the wobble plate be provided with a head adapted to function as the driven part of a simple coupling. Manual means including the driver part of a coupling are provided for selectively providing coupling engagement with a screw head only when screw is in a predetermined oriented position corresponding to a predetermined setting of the TV channel selector.

In order that the invention may be understood, reference is now made to the drawing wherein.

Figures 1, 2, 4:
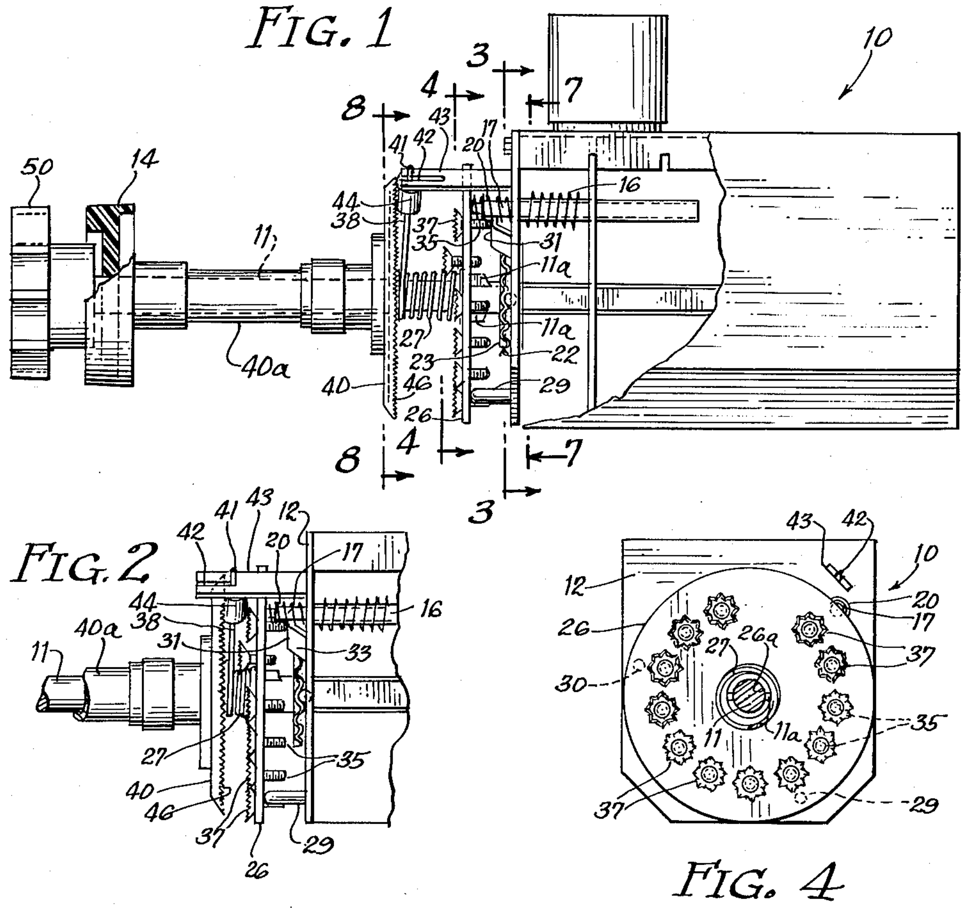
FIGURE 1 is a side view with certain parts broken away of a tuner provided with an attachment embodying the present invention.
FIGURE 2 is a detail illustrating the attachment in an operating position for fine tuning.
FIGURE 4 is a detail on line 4—4 of FIGURE 1.
Figure 3:
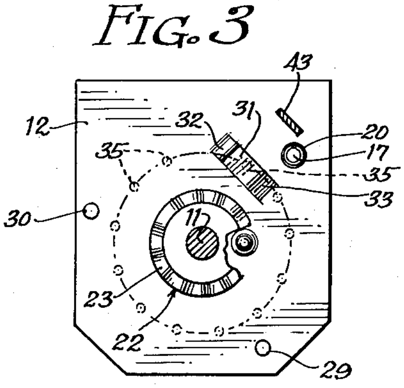
FIGURE 3 is a detail on line 3—3 of FIGURE 1.
Figure 5:
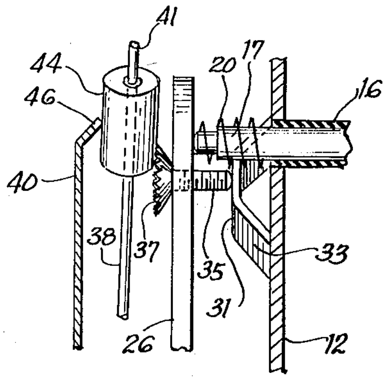
FIGURES 5 and 6 are enlarged details illustrating the action of the attachment at various adjustments.
Figure 6:
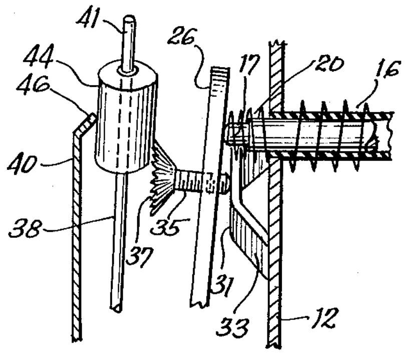
Figure 7:
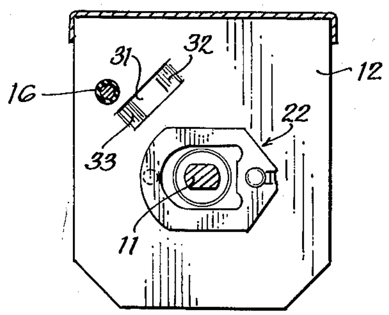
Figure 8:
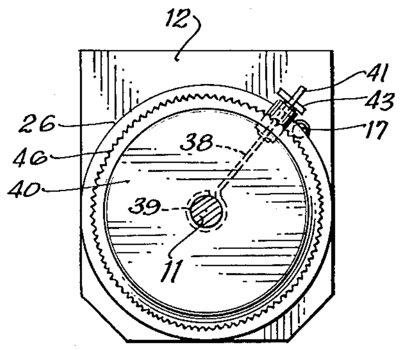

FIGURES 7 and 8 are sectional details upon lines 7—7 and 8—8 of FIGURE 1.

Figure 9:
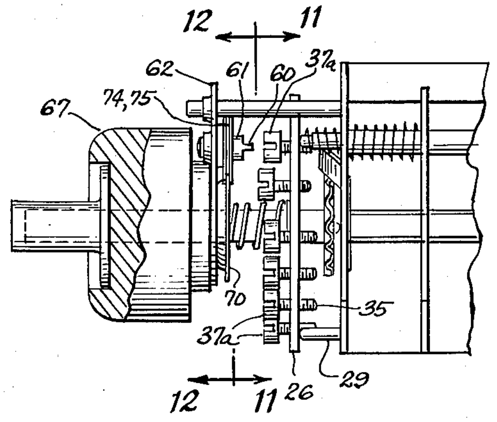

FIGURE 9 is a side view with certain parts broken away of a modified form of attachment embodying the present invention.

Figure 10:
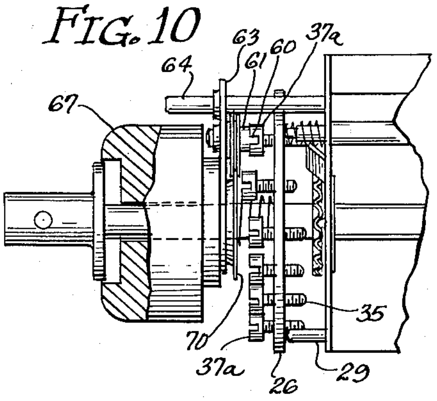

FIGURE 10 is a view similar to FIGURE 9 but showing the parts in different positions.

Figure 11:
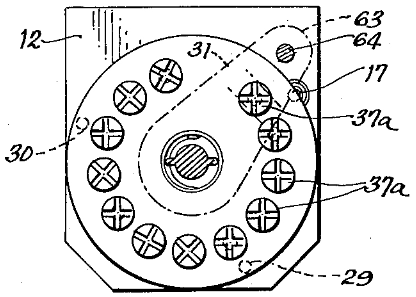
Figure 12:
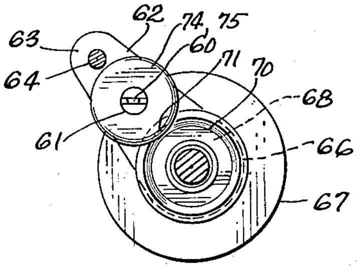

FIGURES 11 and 12 are details on lines 11—11 and 12—12 of FIGURE 9.

Figure 13:
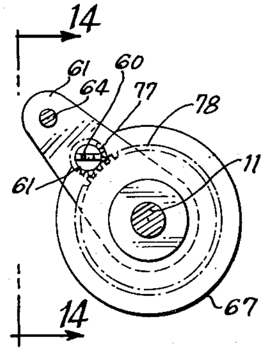

FIGURE 13 is a detail showing a still further modification.

Figure 14:
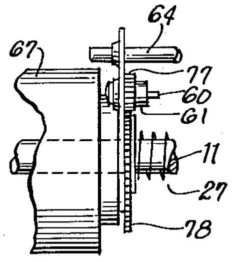

FIGURE 14 is a detail on line 14—14 of FIG. 13.

Referring to FIGURES 1 to 8 inclusive, the TV tuner or channel selector generally indicated by 10 is of the switch type. In this type of TV tuner, each channel setting utilizes individual inductors and capacitors and other circuit elements for providing a channel selecting tuned circuit. In a switch type tuner the circuits utilized for selecting one TV channel are dependent to a considerable degree on the tuning of circuits used for other channels.

TV selector 10 has operating shaft 11 extending outwardly from front panel 12 of the housing of the channel selector. Shaft 11 is provided with fine tuning knob 14 which is normally loose on the shaft.

The number of channels which can be selected will cover channels 2 to 13, inclusive.

Associated with the tuner is a fine tuning means which may consist of an inductor or capacitor variable over a certain range. As illustrated in FIGURES 1 and 2, an inductor 16 is suggested, this inductor usually being connected in the oscillator circuit. Associated with inductor 16 is powdered iron core 17 which may be moved inwardly or outwardly from winding 16 to control the inductance thereof. Core 17 forms part of a plunger which extends through front wall 12 and is biased outwardly by means of coil spring 20. For a particular channel selection, core 17 will have some position which will fine tune the circuits for optimum performance.

The operation of channel selecting by rotation of shaft 11 may be facilitated by index means 22 of any suitable type. Index means 22, as is well understood, will have one portion 23 rigidly attached to and rotatable with shaft 11.

The remainder of the index means cooperates with stationary means. An example of an index means which may be used is illustrated in United States Patent No. 2,115,284, issued on April 26, 1938.

Rotatably locked to shaft 11 by any suitable means is wobble plate 26 of rigid material. This plate is conveniently of metal, although plastic may be used. Plate 26 is rotatably locked to shaft 11 by having lateral projections 11*a* on the shaft cooperate with suitably shaped opening 26*a* in plate 26. Plate 26 is free to tilt away from a position perpendicular to the shaft axis.

Wobble plate 26 has its center portion urged toward index plate 23 by coil spring 27 disposed around shaft 11. The tilt angle between wobble plate 26 and axis of shaft 11 will be determined by three points from the housing of tuner 10. Two of these points are determined by fixed pins 29 and 30, which are angularly spaced with reference to the center of shaft 11. The third point is determined by stop 31 extending forwardly from housing plate 12 toward the wobble plate. Stop 31 has ramps 32 and 33 extending from panel 12. Cooperating with stop 31 are a number of machine screws 35 carried by the wobble plate. The number and angular orientation of screws 35 correspond to desired index positions of shaft 11. Each screw 35 is adapted to cooperate with stop 31 for the channel corresponding to that particular screw. Scraws 35 can be adjusted in wobble plate 26 so that the tilt of the wobble plate due to the third point will be determined by the adjustment of each screw 35 when it engages stop 31.

It is clear that the tilt of wobble plate 26 for each channel selection will be determined by the setting of a particular screw 35. Plunger 17 on the fine tuning attachment is radially in line with or near the active screw engaging stop 31 with respect to the center of shaft 11. Thus, the exact tilt of the wobble plate will determine the setting of fine tuning plunger 17. Screws 35 should clear pins 29 and 30 and this is accomplished by having the radial distance from the shaft axis of fixed support pins 29 and 30 different from that of stop 31.

This invention is primarily concerned with providing a simple means for adjusting the setting of each screw 35. As illustrated in FIGURES 1 to 8, inclusive, each screw 35 is provided with roughened or serrated conical head 37. Disposed around shaft 11 is spring wire arm 38 having portion 39 loosely looped around shaft 11. Loop 39 is in front of plate 40 rigidly joined to knob 14 by sleeve 40*a*. Knob 14, sleeve 40*a*, plate 40 and loop 39 are slidable along shaft 11. Spring arm 38 extends radially from shaft 11 and is oriented to pass through the projection of stop 31.

Spring arm 38 has its free end portion 41 disposed in slot 42 of guide 43 rigidly secured to the housing of tuner 10. Slot 42 permits end portion 41 of the spring arm to move in a direction parallel to the axis of shaft 11.

Rotatively secured on arm 38 is friction member 44 of rubber or the like. Friction member 44 is rotatively mounted on arm 38 and is prevented from sliding along the wire by collars on arm 38. Friction member 44 is so disposed as to be able to cooperate with the conical head of screw 35 only when it is directly over stop 31. Normally, spring 27 keeps spring arm 38 so that friction member 44 is clear of any position of a screw head which is within the range of normal tuning adjustment.

Friction member 44 can also cooperate with serrated edge 46 of plate 40. When knob 14 is pushed inwardly along shaft 11, the parts will assume the position illustrated in FIGURES 5 or 6. Rotation of knob 14 will cause screw 35 to turn. It is clear that knob 14, which is for fine tuning only, can be used to adjust each screw to a selected channel station. The outward travel of knob 14 and plate 40 can be limited by channel selector knob 50 rigidly secured to shaft 11.

Referring now to FIGURES 9 to 12 inclusive, a modification is shown wherein the coupling consists essentially of a screw driver tip as the driver part and a milled or suitably shaped screw head as the driven part. In this construction each screw 35 has head 37*a* which is milled or shaped to accommodate a screw driver tip. The milled head of active screw 35 which is in line with stop 31 can be rotated in either direction by screw driver tip 60 carried by stub shaft 61 journaled for rotation in arm 62. Arm 62 is secured and oriented in such a position that it may be moved laterally so that stub shaft 61 moves along a line coincident with the axis of active screw 35, this being the screw which is in line with stop 31 and would normally bear on this.

Arm 62 is slidably secured at end portion 63 of the arm to guide rod 64 carried by the tuner housing and extending forwardly laterally offset from, but parallel to, the axis of shaft 11. In order to secure the proper orientation of arm 62, other end portion 66 of arm 62 is disposed over shoulder 68 of fine tuning knob 67. End portion 66 of arm 62 is suitably apertured to provide a smooth fit for the shoulder. Thus arm 62 has its two end portions fixed in space against any movement except in a direction parallel to shaft 11. Shoulder 68 of fine tuning knob 67 carries friction disk 70 rigidly attached thereto to move with the fine tuning knob. Friction disk 70 has its active edge 71 tightly gripped between two resilient washers 74 and 75 rigidly secured on stub shaft 61 for rotation with screw driver tip portion 60.

The parts are so designed that normally fine tuning knob 67 and arm 62 with the friction disk drive can be retracted to the position illustrated in FIGURE 9 where the screw driver tip is clear of the head of any active screw 35 within the limits over which screw 35 is to be adjusted. When it is desired to make an adjustment for fine turning, corresponding to a particular setting of the tuner, the fine tuning knob is pushed inwardly against spring 27 and is also turned. The rotation of the fine tuning knob together with the pressure forcing the fine tuning knob toward the housing of the tuner will cause engagement between the screw driver tip and the active screw head and cause the screw body to move in or out of the wobble plate. The normal rest position of the fine tuning knob may be determined by station selecting knob 76 rigidly secured to shaft 11.

Instead of having a friction drive between the fine tuning knob and active screw head, it is possible to provide a gear drive as illustrated in FIGURES 13 and 14. Instead of friction disks, gears 77 and 78 are provided. It is possible to have the fine tuning knob mounted laterally away from shaft 11. However, the arrangement illustrated is convenient and simple.

What is claimed is:

1. A fine tuning attachment for use with a device having a projecting shaft rotatable to a plurality of index positions, said attachment comprising a rigid wobble plate having a central aperture for clearing said shaft and permitting the plate to tilt with respect to said shaft, said plate being adapted to turn with said shaft, means for urging said plate as a whole in one direction along said shaft, said direction being toward the device when said attachment is installed, means providing three fixed support points angularly spaced around said shaft for limiting the movement of said plate in response to said plate urging means, one such support point being located radially from the plate center at a different distance from the remaining two points, a plurality of screws carried by said plate for successive cooperation with said one support point as said plate is turned with said shaft, said screws being angularly oriented on said plate so that each screw when located at said one support point represents an index position, said plate having a tilt at each index position which will be determined by the adjustment of the corresponding screw, said device having a means responsive to the tilt of said plate to be controlled for each index position, each screw having a head, said head being shaped to function as the driven part of a coupling, a coupling driver part, an intermediate power transmitting member, fixed in position radially and movable axially of said shaft, in axial alignment with a screw at said one support point, means for supporting said coupling driver part and said power transmitting member in a normally inoperative position and means for moving said driver part axially, moving said intermediate power transmitting member into engagement with the screw head at said one support point.

2. A fine tuning attachment for use with a device having a projecting shaft rotatable to a plurality of index positions, said attachment comprising a wobble plate having a central aperture for clearing said shaft and permitting the plate to tilt with respect to said shaft, said plate being adapted to turn with said shaft, means for urging said plate as a whole in one direction along said shaft, said direction being toward the device when said attachment is installed, means providing three fixed support points angularly spaced around said shaft for limiting the movement of said plate in response to said plate urging means, one such support point being located radially from the plate center at a different distance from the remaining two points, a plurality of screws carried by said plate for successive cooperation with said one support point as said plate is turned with said shaft, said screws being angularly oriented on said plate so that each screw when located at said one support point represents an index position, said plate having a tilt at an index position which will be determined by the adjustment of the corresponding screw, said device having a means responsive to the tilt of said plate to be controlled for each index position, each screw having a head, said head being shaped to function as the driven part of a coupling, a drive member, means for mounting said drive member to be rotatable about an axis and to be movable along said axis toward any away from said wobble plate, means for normally biasing said drive member to a position away from said wobble plate, coupling driver part, means for mounting said driver part to be turned by said drive member and to move with said member along a path parallel to said axis, and means for maintaining such coupling driver part along the axis of a particular screw which is in proper position at said one support for being adjusted whereby said drive member can be turned and moved to cause engagement of said coupling driver part with a selected screw to turn the latter for adjusting the same.

3. The construction according to claim 2 wherein said drive member is mounted concentric with the shaft axis and wherein said coupling driver part is supported on a part radially of said shaft.

4. The construction according to claim 1 wherein said individual screw heads have a serrated edge, intermediate power transmitting member being made of flexible material for engaging said driver part and said serrated edges.

5. The construction according to claim 1 wherein said individual screw heads are slotted and wherein the coupling driver part drives said intermediate power transmitting member which includes a screw driver portion.

6. A fine tuning attachment for use with a device having a projecting shaft rotatable to a plurality of index positions, said attachment comprising a wobble plate having a central aperture for clearing said shaft and permitting the plate to tilt with respect to said shaft, said plate being adapted to turn with said shaft, means for urging said plate as a whole in one direction along said shaft, said direction being toward the device when said attachment is installed, means providing three fixed support points angularly spaced around said shaft for limiting the movement of said plate in response to said plate urging means, one such support point being located radially from the plate center at a different distance from the remaining two points, a plurality of screws carried by said plate for successive cooperation with said one support point as said plate is turned with said shaft, said screws being angularly oriented on said plate so that each screw when located at said one support point represents an index position, said plate having a tilt at an index position which will be determined by the adjustment of the corresponding screw, said device having a means responsive to the tilt of said plate to be controlled for each index position, each screw having a head, said head being shaped to function as the driven part of a coupling, a drive member rotatably secured on said shaft in front of said wobble plate, said drive member being longitudinally movable along said shaft over a limited range, means for biasing said drive member away from said wobble plate, an arm having one end portion shaped to encircle said shaft, said one end portion being free to move along said shaft between said drive member and said wobble plate, means for supporting said arm so that it extends away from the shaft and perpendicular thereto and is oriented toward the one support point when viewed endwise, and coupling driver means rotatably supported on said arm and engageable with said drive member, said coupling driver part being movable with said arm upon movement of said drive member toward said wobble plate to engage a screw head.

7. The construction according to claim 6 wherein said means for biasing said drive member comprises a coil spring extending around the shaft between the wobble plate and drive member.

8. The construction according to claim 6 wherein the means for supporting said arm includes a support extending forwardly from the device parallel to the axis of the shaft for guiding the outer end of the arm.

9. The construction according to claim 2 wherein said drive member and said coupling driver part are connected together by gears.

10. The construction according to claim 2 wherein said drive member and said coupling driver part are connected together by friction means.

References Cited in the file of this patent

UNITED STATES PATENTS

| | | |
|---|---|---|
| 2,494,493 | Schaevitz | Jan. 10, 1950 |
| 2,588,093 | Dull | Mar. 4, 1952 |
| 2,613,540 | Keim | Oct. 14, 1952 |
| 2,731,608 | Mifflin | Jan. 17, 1956 |
| 2,901,615 | Devendorf | Aug. 25, 1959 |
| 2,942,108 | Goldstein et al. | June 21, 1960 |
| 2,957,356 | Meyer | Oct. 25, 1960 |
| 2,979,615 | Bang | Apr. 11, 1961 |
| 2,981,838 | Poskozim | Apr. 25, 1961 |